(12) United States Patent
Kreichman et al.

(10) Patent No.: US 10,102,100 B2
(45) Date of Patent: Oct. 16, 2018

(54) OPTIMIZING AUTOMATED INTERACTIONS WITH COMPUTER SOFTWARE APPLICATIONS

(75) Inventors: Igal Kreichman, Haifa (IL); Ariel Sakin, Hertzliya (IL); Omer Tripp, Hertzliya (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2086 days.

(21) Appl. No.: 13/306,089

(22) Filed: Nov. 29, 2011

(65) Prior Publication Data

US 2013/0139077 A1 May 30, 2013

(51) Int. Cl.
*G06F 3/048* (2013.01)
*G06F 11/34* (2006.01)

(52) U.S. Cl.
CPC ...... *G06F 11/3414* (2013.01); *G06F 11/3438* (2013.01); *G06F 2201/81* (2013.01); *G06F 2201/865* (2013.01)

(58) Field of Classification Search
None
See application file for complete search history.

(56) References Cited

U.S. PATENT DOCUMENTS

| 7,693,817 | B2* | 4/2010 | Dumais et al. | 707/999.002 |
| 9,235,848 | B1* | 1/2016 | Gourley | G06Q 30/0209 |
| 9,449,279 | B2* | 9/2016 | Verkasalo | G06F 17/30241 |
| 9,904,709 | B2* | 2/2018 | Krumm | G06F 17/30522 |
| 2010/0287462 | A1* | 11/2010 | Hauser | 715/241 |

OTHER PUBLICATIONS

Lu, M., et al., "Real-Time Crawler Based on Hot-Rank Algorithm," [online] Journal of Computational Information Systems, vol. 4, No. 3, pp. 1265-1272, Jun. 2008, retrieved from the Internet: <http://www.jofcis.com/publishedpapers/2008_4_3_1265_1272.pdf>.

* cited by examiner

*Primary Examiner* — Thanh Vu
(74) *Attorney, Agent, or Firm* — Cuenot, Forsythe & Kim, LLC

(57) ABSTRACT

Performing an automated interaction with a computer software application by identifying, among a plurality of regions of an interface of a computer software application, a region for which a region-level measure exists of user interaction that occurred within the region of the interface, determining if the region-level measure meets or exceeds a predefined minimum level of user interaction, and performing an automated interaction with an element at least partly found within the region if the region-level measure meets or exceeds the predefined minimum level of user interaction.

14 Claims, 9 Drawing Sheets

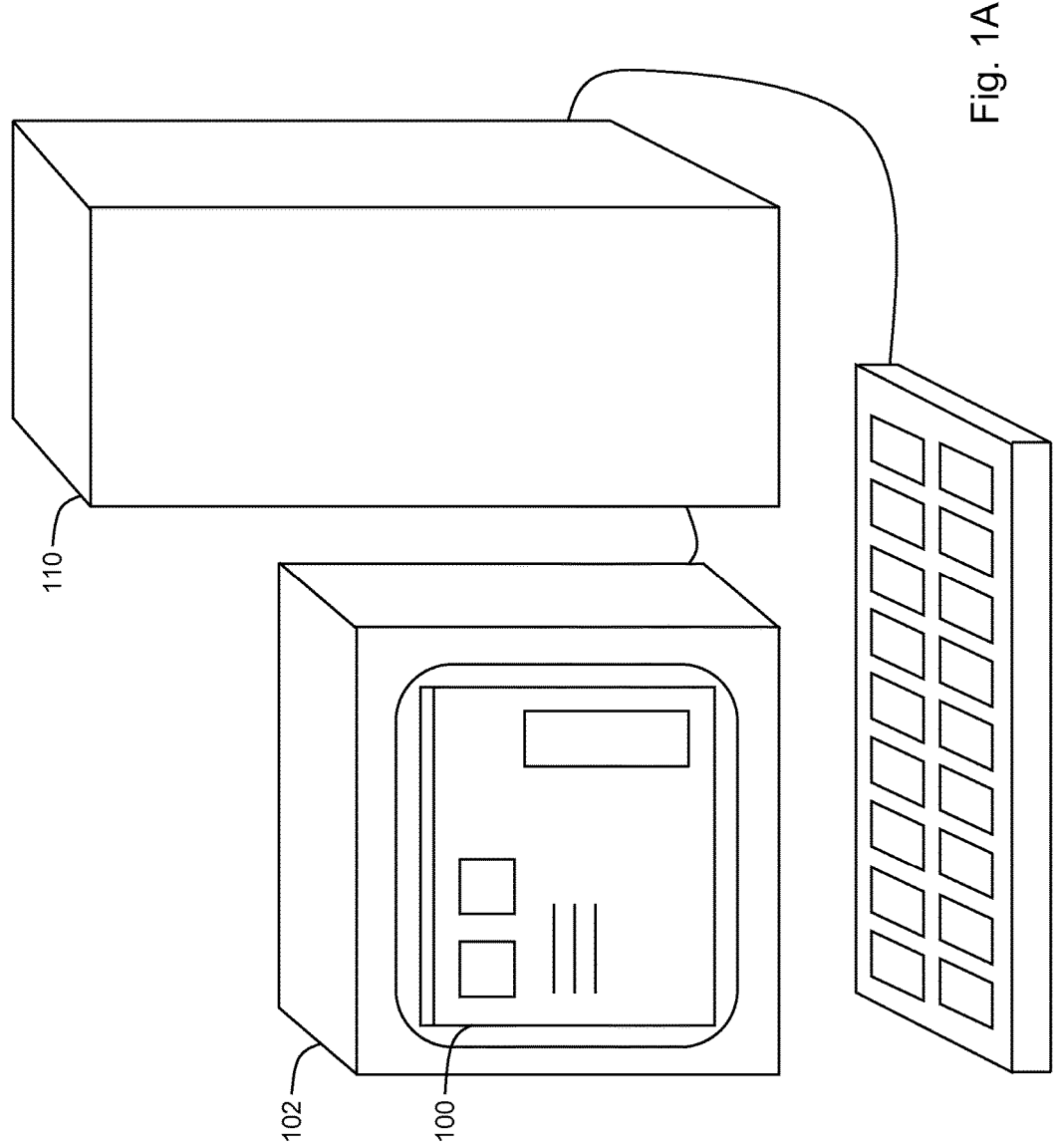

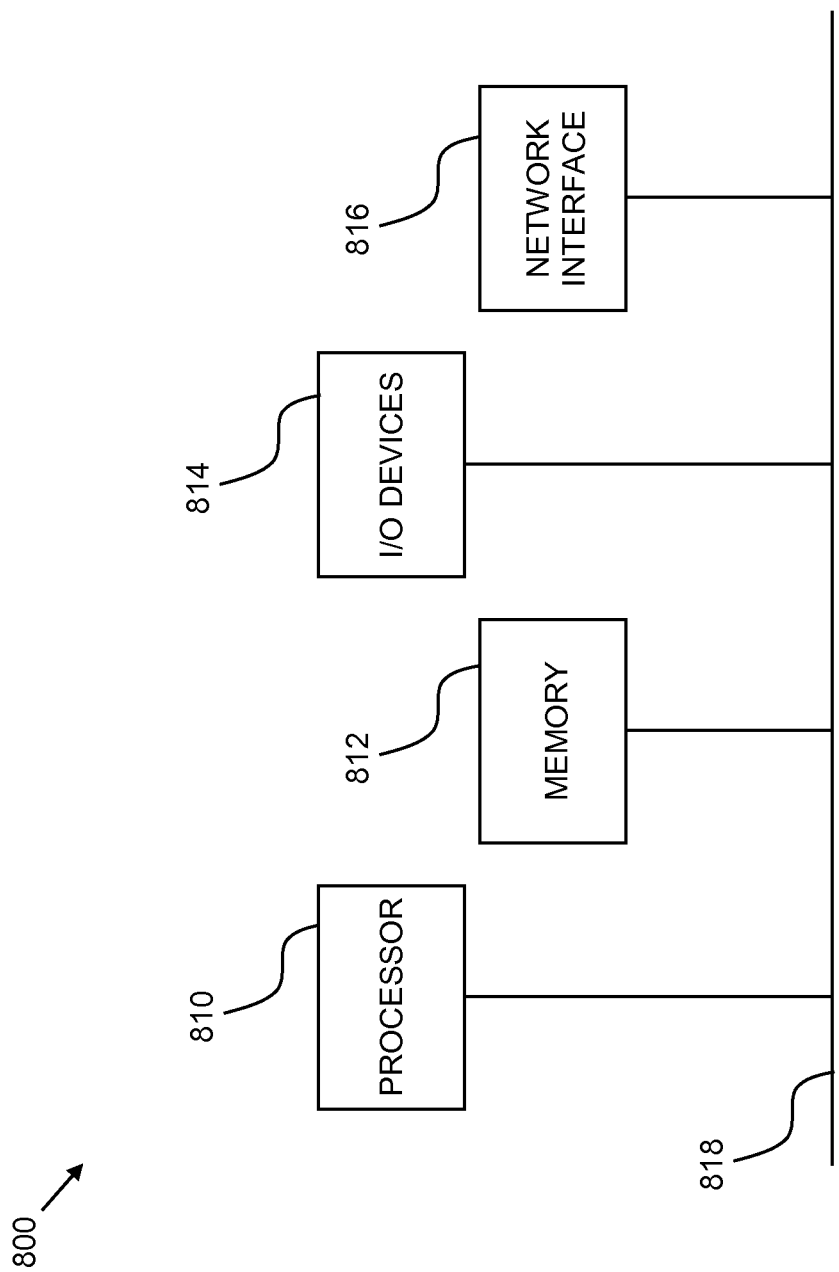

OPTIMIZING AUTOMATED INTERACTIONS WITH COMPUTER SOFTWARE APPLICATIONS

FIELD OF THE INVENTION

The invention relates to computer software analysis and testing in general.

BACKGROUND OF THE INVENTION

Automated software tools have long been used to autonomously interact with computer software applications, such as to discover the various components of an application for mapping purposes, or to identify programming errors and security vulnerabilities in an application. For example, one such tool, commonly known as a "crawler," is often used to navigate a web site by traversing its web pages and other computer-based documents along hyperlinks, such as Universal Resource Locators (URLs), embedded in the documents that indicate the locations of other documents. Another such tool, commonly known as a "black-box tester," is often used to interact with an application, such as an Internet-based "web" application, by activating interface elements such as its menus and buttons, and by providing data input through interface elements such as textboxes.

One of the challenges faced by such tools relates to prioritizing the interactions performed with an application, as some interactions may be of greater importance than others. For example, when mapping the web pages that comprise a web site, it is typically more important to traverse a hyperlink that leads to a destination within the web site than to traverse a hyperlink that leads to a different web site, such as where the hyperlink is part of an advertisement. Similarly, when black-box testing an application, it is typically more important to interact with interface elements that are associated with the application's business logic than to interact with interface elements that provide content, such as menu options for accessing "About" or "FAQ" information. Unfortunately, it is often difficult to make such determinations heuristically or otherwise without manual intervention.

Another challenge relates to determining whether an area of an application was previously evaluated, in which case it need not be evaluated again. For example, where traversing a hyperlink leads to a web page whose hyperlinks were previously traversed, its hyperlinks need not be traversed again. Unfortunately, where some of a web page's hyperlinks change dynamically from access to access, it is likewise difficult to make such determinations.

SUMMARY OF THE INVENTION

In one aspect of the invention a method is provided for performing an automated interaction with a computer software application, the method including identifying, among a plurality of regions of an interface of a computer software application, a region for which a region-level measure exists of user interaction that occurred within the region of the interface, determining if the region-level measure meets or exceeds a predefined minimum level of user interaction, and performing an automated interaction with an element at least partly found within the region if the region-level measure meets or exceeds the predefined minimum level of user interaction.

In another aspect of the invention a method is provided for determining the similarity of computer software application interfaces, the method including performing a comparison of structure within a first region of a baseline interface of a computer software application with structure in a corresponding region of a comparison interface of the computer software application, where a region-level measure of the first region meets or exceeds a predefined minimum level of user interaction, thereby determining a first similarity measure between the base interface and the comparison interface, performing a comparison of structure within a second region of the baseline interface with structure in a corresponding region of the comparison interface, where a region-level measure of the second region does not meet or exceed the predefined minimum level of user interaction, thereby determining a second similarity measure between the base interface and the comparison interface, applying a weight to the first similarity measure that is greater than any weight applied to the second similarity measure, and determining a combined similarity measure from the first similarity measure and the second similarity measure.

In another aspect of the invention a method is provided for determining the similarity of computer software application interfaces, the method including identifying among a plurality of regions of a baseline interface of a computer software application a region for which a region-level measure exists of user interaction that occurred within the region, and performing a comparison of structure within the region of the baseline interface with structure in a corresponding region of a comparison interface of the computer software application if the region-level measure meets or exceeds the predefined minimum level of user interaction, thereby determining a similarity measure between the base interface and the comparison interface.

Systems and computer-program products embodying the invention are also provided.

BRIEF DESCRIPTION OF THE DRAWINGS

The invention will be understood and appreciated more fully from the following detailed description taken in conjunction with the appended drawings in which:

FIGS. 1A and 1B, taken together, is a simplified conceptual illustration of a system for measuring user interaction with a computer software application, constructed and operative in accordance with an embodiment of the invention;

FIG. 8 is a simplified block diagram illustration of an exemplary hardware implementation of a computing system, constructed and operative in accordance with an embodiment of the invention.

DETAILED DESCRIPTION OF THE INVENTION

Figure 1B:
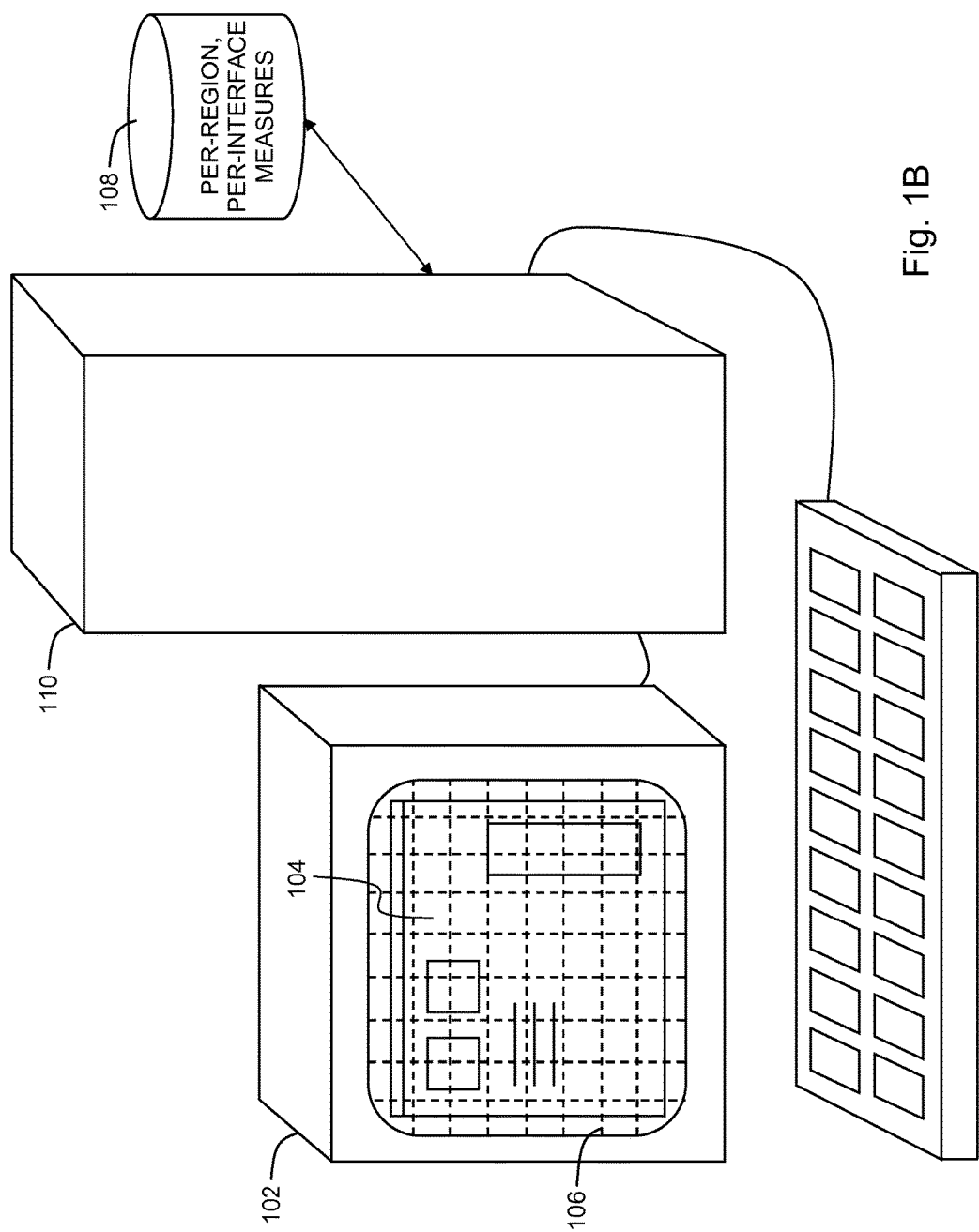

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIGS. 1A and 1B, which, taken together, is a simplified conceptual illustration of a system for measuring user interaction with a computer software application, constructed and operative in accordance with an embodiment of the invention. In the system of FIGS. 1A and 1B, one or more regions of an interface 100 of a computer software application are defined, such as by programmatically dividing the display area of a computer display 102 into one or more virtual, square-shaped regions 104 that form a grid 106, shown in dashed lines in FIG. 1B, although any number of regions of any shapes and sizes may be defined, and defining corresponding regions of interface 100 that appear within the regions 104 when interface 100 is displayed on computer display 102. Hereinafter, reference to a particular region 104 of computer display 102 may be understood to refer to the corresponding region of interface 100 that appears within the particular region 104, and may thus be referred to as the particular region 104 of interface 100. Thus, each region 104 of interface 100 may be related to individually, particularly regarding user interaction with interface 100 that occurs within a particular region 104 of interface 100, such as using a pointing device in the particular region 104. Interface 100 as shown in FIGS. 1A and 1B is a rendered web page of an Internet-based web application, although interface 100 may be any type of application interface of any type of computer software application.

User interaction occurring within any region of interface 100 is preferably measured separately from user interaction occurring in other regions of interface 100, and may be measured using any metric, such as the number or frequency of pointing device interactions (e.g., "mouse clicks") and/or keyboard interactions that occur within a region. The per-region, per-interface measures of user interaction may be determined using any suitable technique, such as where the computer software application is itself configured to make such measurements, or where the computer software application is monitored by a separate computer software application that is configured to make such measurements. User interaction may thus be measured for any region of any of the interfaces of a computer software application in this manner, where the interaction is provided by one or more users in one or more sessions during which the computer software application is executed on one or more computers. A consolidated, per-region, per-interface measure is preferably determined for the computer software application using any suitable technique consolidating user activity for all users, sessions, and/or computers. The per-region, per-interface measures of user interaction with a computer software application are preferably stored in a data store 108.

Any of the elements shown in FIGS. 1A and 1B are preferably implemented by one or more computers, such as a computer 110, by implementing the elements in computer hardware and/or in computer software embodied in a non-transient, computer-readable medium in accordance with conventional techniques.

Figure 2:
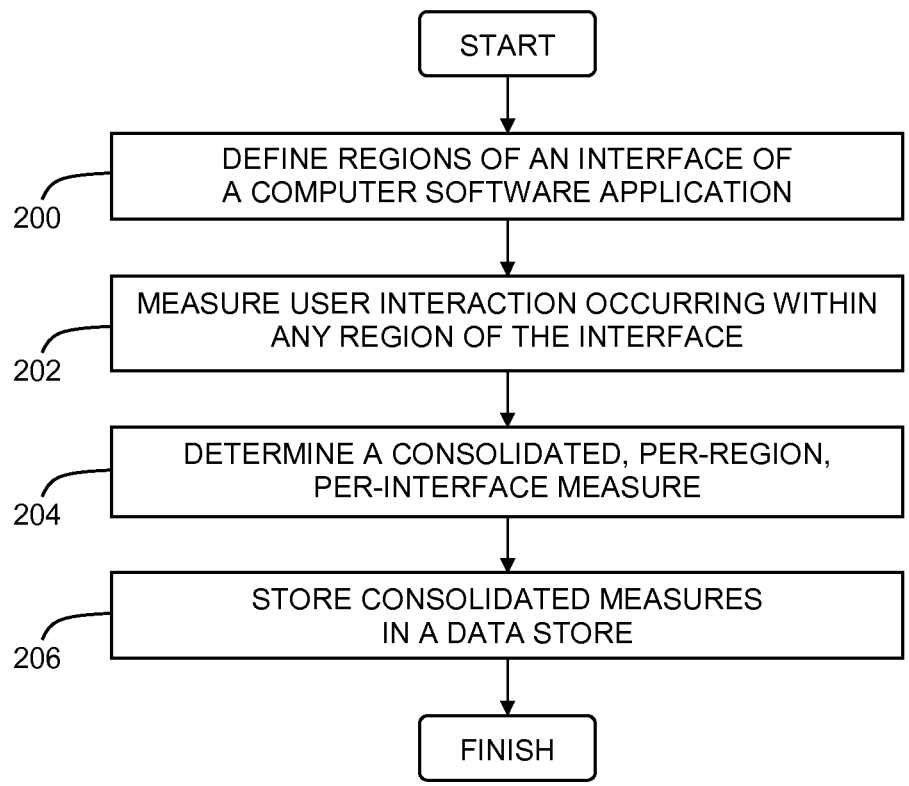
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIGS. 1A and 1B, operative in accordance with an embodiment of the invention. In the method of FIG. 2, one or more regions of an interface of a computer software application are defined (step 200). User interaction occurring within any region of the interface is measured (step 202). A consolidated, per-region, per-interface measure is determined for the computer software application (step 204), and is stored in a data store (step 206).

The system of FIGS. 1A and 1B and method of FIG. 2 may thus, for example, be used to measure user interaction occurring within one or more regions of the web page shown in FIGS. 1A and 1B, such as where a user "clicked" on a hyperlink 110 within one region or on an advertisement graphic 112 within another region. In this manner it may be determined which regions of interface 100 received a greater degree of user interaction, and which regions received little or no user interaction.

Figure 3:
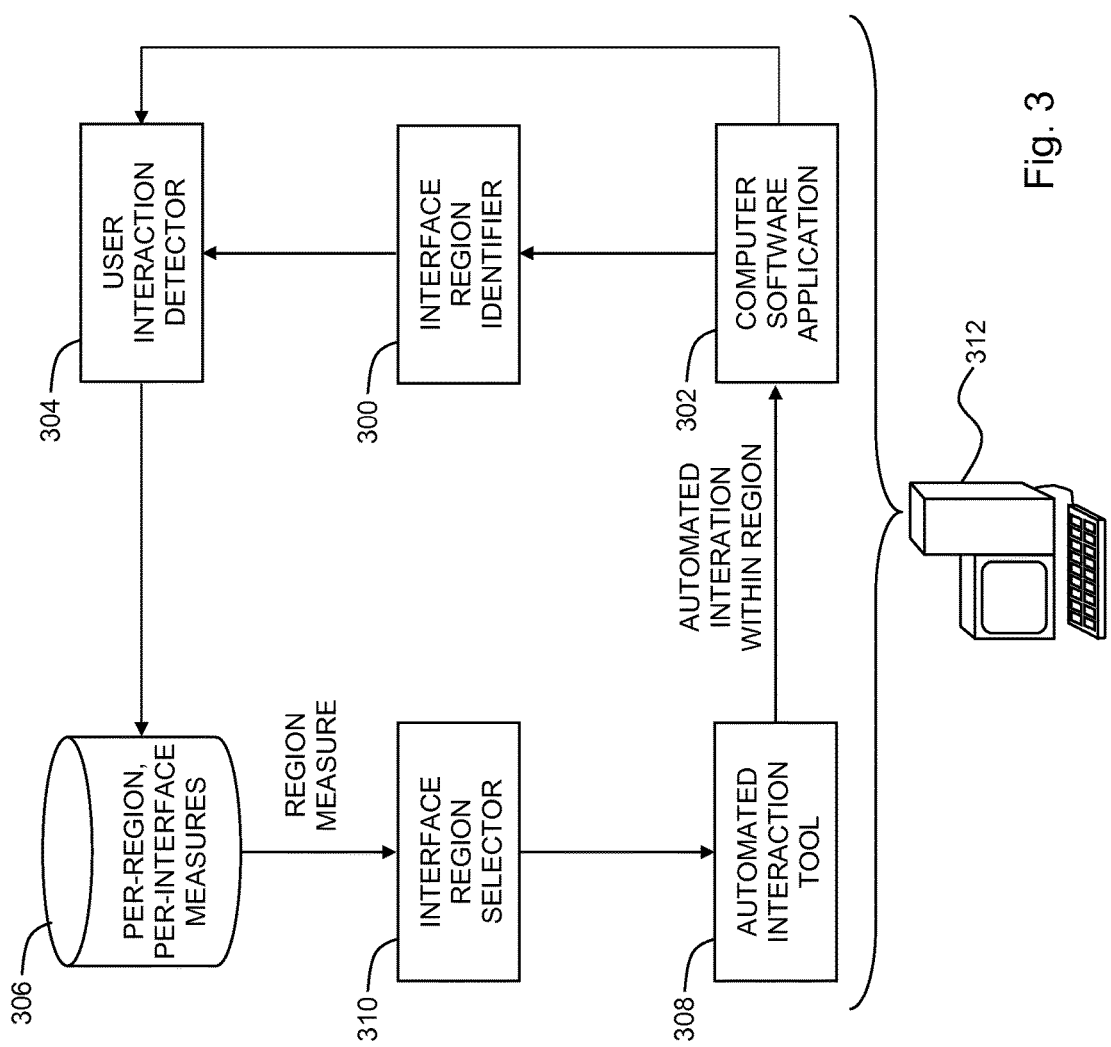
FIG. 3 is a simplified conceptual illustration of a system for performing an automated interaction with a computer software application, constructed and operative in accordance with an embodiment of the invention.

Reference is now made to FIG. 3, which is a simplified conceptual illustration of a system for performing an automated interaction with a computer software application, constructed and operative in accordance with an embodiment of the invention. In the system of FIG. 3, an interface region identifier 300 is preferably configured to define regions of the interfaces of a computer software application 302 as described hereinabove, and a user interaction detector 304 is preferably configured to detect user interactions within the regions of the interfaces of computer software application 302, determine per-region, per-interface measures of such interactions as described hereinabove, and store the measures in a data store 306. Computer software application 302 may be any known type of software application that may be executed by a computer or otherwise hosted by a computer for user and/or automated interaction, examples of which include an Internet-based "web" application and an executable C++ application. An automated interaction tool 308, examples of which include a black-box tester, such as IBM Rational AppScan™, commercially-available from International Business Machines Corporation, Armonk, N.Y., and a web crawler, is preferably configured to interact with computer software application 302 in accordance with conventional techniques except as otherwise described herein. Automated interaction tool 308 preferably includes, or is otherwise configured to cooperate with, an interface region selector 310 configured to identify a region of an interface of computer software application 302 for which a region-level measure exists of user interaction that occurred within the region of the interface, such as is stored in data store 306. Automated interaction tool 308 is preferably configured to perform one or more automated interactions with any interface element found partly or wholly within the identified region of the interface if the region-level measure meets or exceeds a predefined minimum level of user interaction, such as may be determined by either of automated interaction tool 308 and interface region selector 310. Automated interaction tool 308 is also preferably configured to perform fewer or no automated interactions with any interface element found partly or wholly within the identified region if the region-level measure does not meet or exceed the predefined minimum level of user interaction than if the region-level measure does meet or exceed the predefined minimum level of user interaction. The automated interactions may, for example, include any actions performed by crawlers or black-box testers with respect to web or computer application interfaces.

Any of the elements shown in FIG. 3 are preferably implemented by one or more computers, such as a computer 312, by implementing the elements in computer hardware and/or in computer software embodied in a non-transient, computer-readable medium in accordance with conventional techniques.

Figure 4:
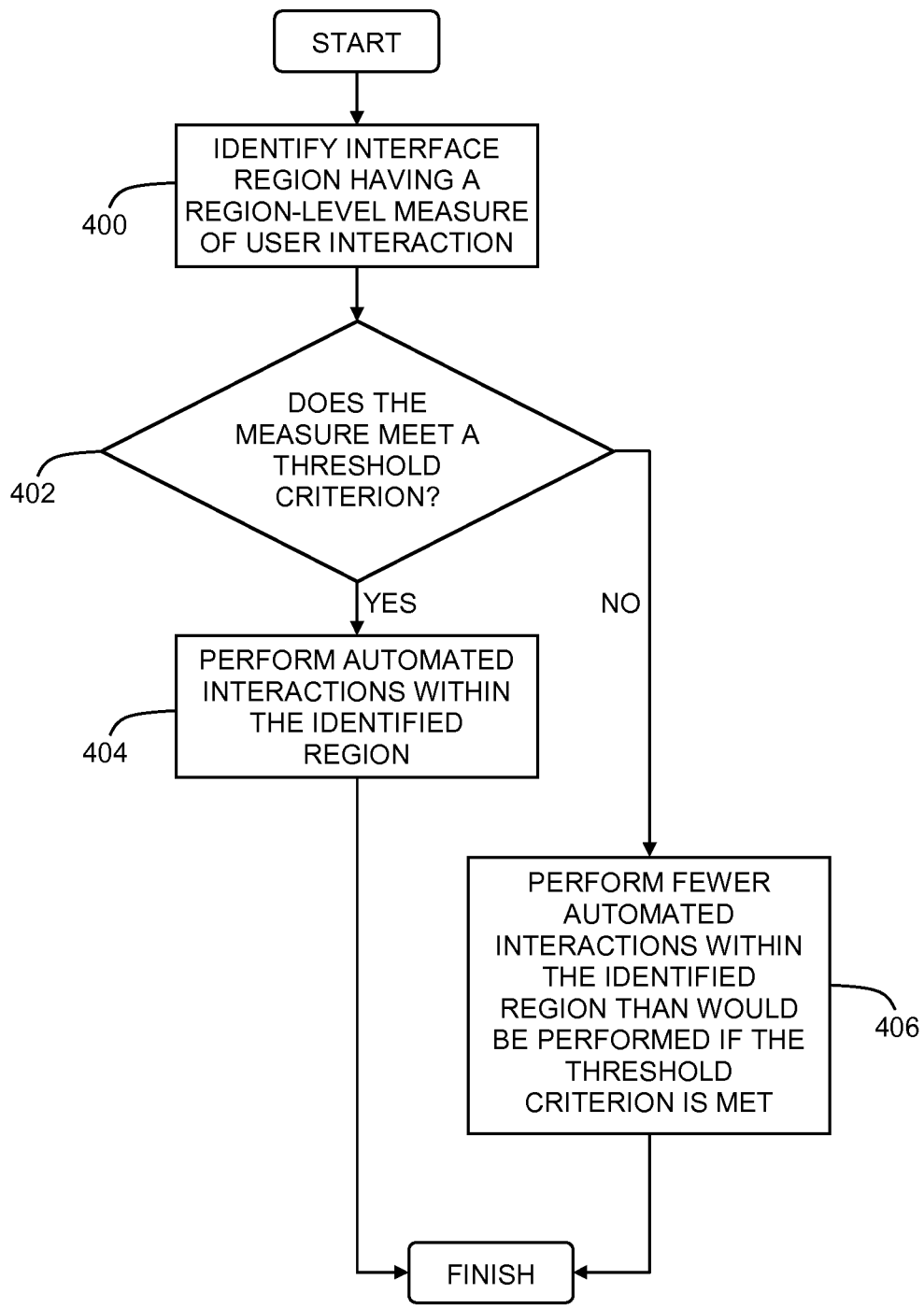
FIG. 4 is a simplified flowchart illustration of an exemplary method of operation of the system of FIG. 3, operative in accordance with an embodiment of the invention.

Reference is now made to FIG. 4, which is a simplified flowchart illustration of an exemplary method of operation of the system of FIG. 3, operative in accordance with an embodiment of the invention. In the method of FIG. 4, a region of an interface of a computer software application is identified for which a region-level measure exists of user interaction that occurred within the region of the interface (step 400). If the region-level measure meets or exceeds a predefined minimum level of user interaction (step 402), one or more automated interactions are performed within the identified region (step 404). Otherwise, fewer automated interactions are performed within the identified region than would be performed if the predefined minimum level of user interaction is met (step 406), or none at all.

The system of FIG. 3 and method of FIG. 4 may thus, for example, be used to optimize automated interaction with the web page shown in FIGS. 1A and 1B by performing automated interactions with elements of those regions of the web page that are known to have had a greater degree of user interaction, and performing fewer or no automated interactions with elements of those regions of the web page that received little or no user interaction. Thus, if the web page includes a region in which a hyperlink is displayed, and the region-level measure for the region meets or exceeds the predefined minimum level of user interaction indicating a greater degree of user interaction, then it may be assumed that the region is important, and a web crawler may crawl hyperlinks that appear within the region. Conversely, if the web page includes a region in which an advertisement graphic is displayed, and the region-level measure for the region does not meet or exceed the predefined minimum level of user interaction, thereby indicating a lesser degree of user interaction, then it may be assumed that the region is less important, and a web crawler may crawl fewer hyperlinks that appear within the region or ignore the region altogether.

Figure 5:
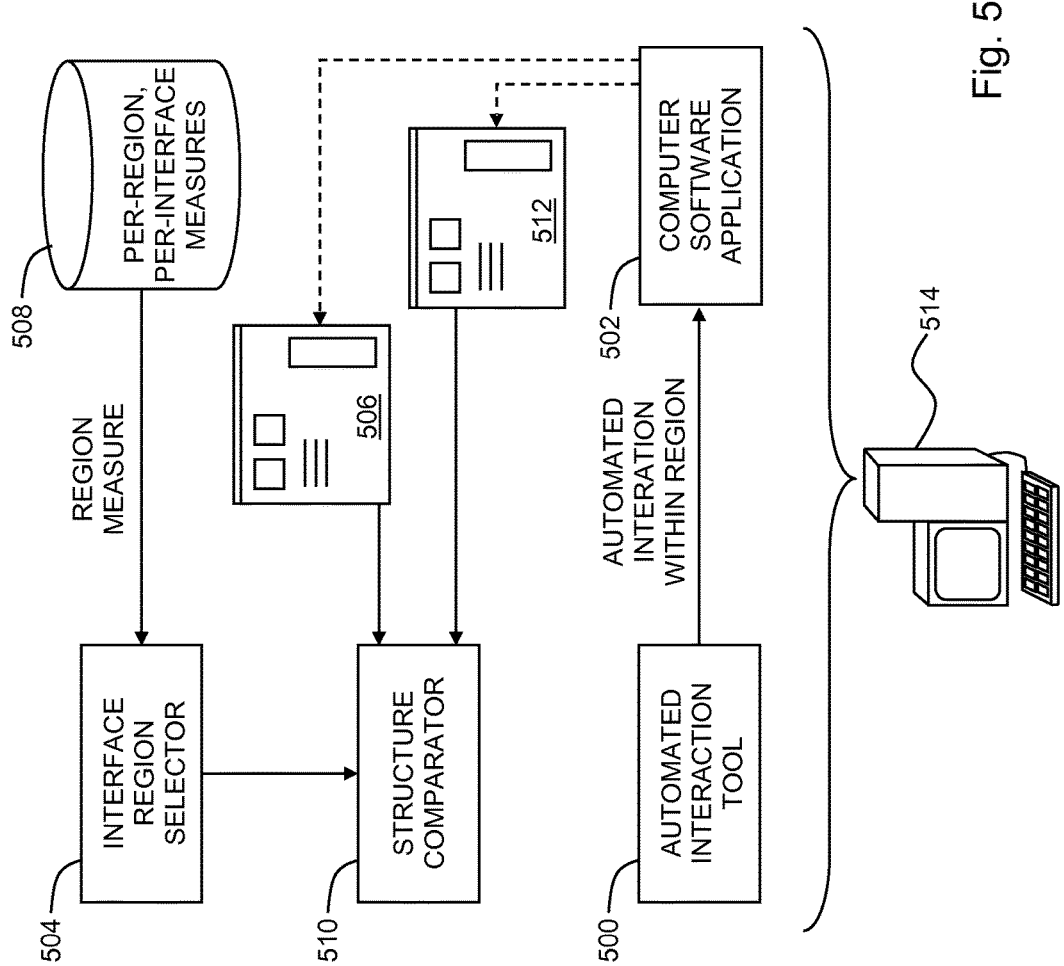
FIG. 5 is a simplified conceptual illustration of a system for determining the similarity of computer software application interfaces, constructed and operative in accordance with an embodiment of the invention.

Reference is now made to FIG. 5, which is a simplified conceptual illustration of a system for determining the similarity of computer software application interfaces, constructed and operative in accordance with an embodiment of the invention. The system of FIG. 5 may employ interface region identifier 300 and user interaction detector 304 of the system of FIG. 3 for defining interface regions and measuring user interaction as described hereinabove. In the system of FIG. 5, an automated interaction tool 500, examples of which include the black-box tester and web crawler described hereinabove with reference to FIG. 3, is preferably configured to interact with a computer software application 502 in accordance with conventional techniques except as otherwise described herein. Computer software application 502 may be any known type of software application as described hereinabove with reference to FIG. 3. Automated interaction tool 500 preferably includes, or is otherwise configured to cooperate with, an interface region selector 504 configured to identify a region of an interface 506 of computer software application 502 for which a region-level measure exists of user interaction that occurred within the region of interface 506, such as where such information is stored in a data store 508. Automated interaction tool 500 preferably includes, or is otherwise configured to cooperate with, a structure comparator 510 configured to perform a comparison of structure within the region of interface 506, also referred to as the "baseline" interface, with structure in a corresponding region of a comparison interface 512 of computer software application 502 if the region-level measure meets or exceeds a predefined minimum level of user interaction, thereby determining a similarity measure. Automated interaction tool 500 may perform an automated interaction with any element of comparison interface 512 if the similarity measure meets a predefined criterion indicating that baseline interface 506 and comparison interface 512 are dissimilar, and may desist from performing automated interactions with elements of comparison interface 512 if the similarity measure meets a predefined criterion indicating that baseline interface 506 and comparison interface 512 are similar. Thus, for example, if baseline interface 506 and comparison interface 512 are web pages and are found to be similar, automated interactions with elements of comparison interface 512 may be avoided on the assumption that the baseline and comparison web pages are, in fact, the same web page but for changing advertisements, if automated interactions, such as crawling, were previously performed with elements of the web page.

Alternatively, structure comparator 510 is configured to perform a comparison of structure within a first region of baseline interface 506 with structure in a corresponding region of comparison interface 512 where the region-level measure of the first region meets or exceeds a predefined minimum level of user interaction, thereby determining a first similarity measure. Structure comparator 510 also performs a comparison of structure within a second region of baseline interface 506 with structure in a corresponding region of comparison interface 512 where the region-level measure of the second region does not meet or exceed the predefined minimum level of user interaction, thereby determining a second similarity measure. Structure comparator 510 determines a combined similarity measure from the first similarity measure and the second similarity measure where a greater weight is applied to the first similarity measure than to the second similarity measure. Automated interaction tool 500 may perform an automated interaction with any element of comparison interface 512 if the combined similarity measure meets a predefined criterion indicating that baseline interface 506 and comparison interface 512 are dissimilar, and may desist from performing automated interactions with elements of comparison interface 512 if the similarity measure meets a predefined criterion indicating that baseline interface 506 and comparison interface 512 are similar.

Any of the elements shown in FIG. 5 are preferably implemented by one or more computers, such as a computer 514, by implementing the elements in computer hardware and/or in computer software embodied in a non-transient, computer-readable medium in accordance with conventional techniques.

Figure 6:
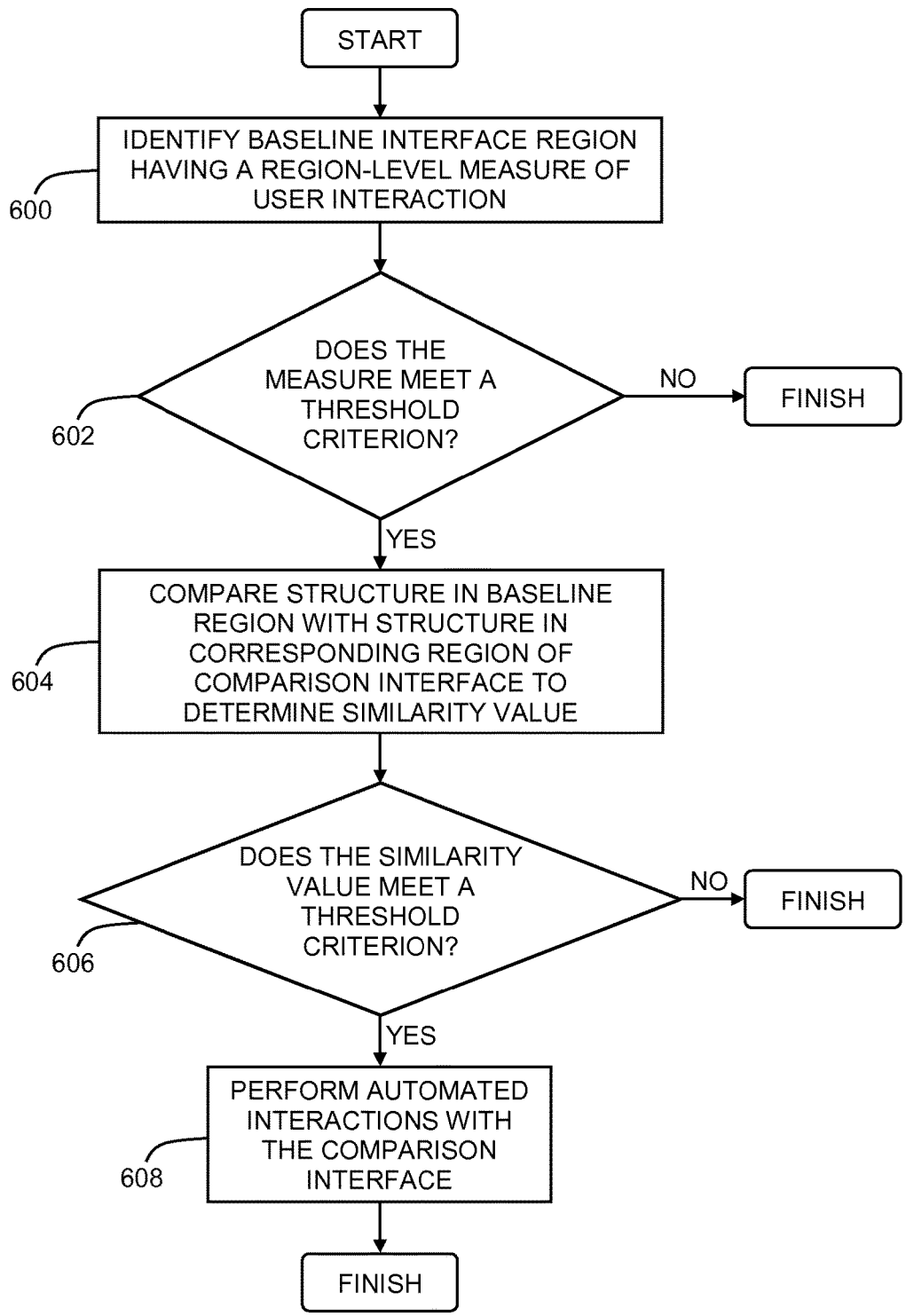
FIG. 6 is a simplified flowchart illustration of an exemplary method of operation of the system of FIG. 5, operative in accordance with an embodiment of the invention.

Reference is now made to FIG. 6, which is a simplified flowchart illustration of an exemplary method of operation of the system of FIG. 5, operative in accordance with an embodiment of the invention. In the method of FIG. 6, a region of a baseline interface of a computer software application is identified for which a region-level measure exists of user interaction that occurred within the region of the interface (step 600). If the region-level measure meets or exceeds a predefined minimum level of user interaction (step 602), a comparison is performed of structure within the region of the baseline interface with structure in a corresponding region of a comparison interface of the computer software application, thereby determining a similarity measure (step 604). If the similarity measure meets a predefined criterion indicating that the baseline interface and the comparison interface are dissimilar (step 606), one or more automated interactions are performed with any element of the comparison interface (step 608), such as in accordance with the method of FIG. 4.

Figure 7:
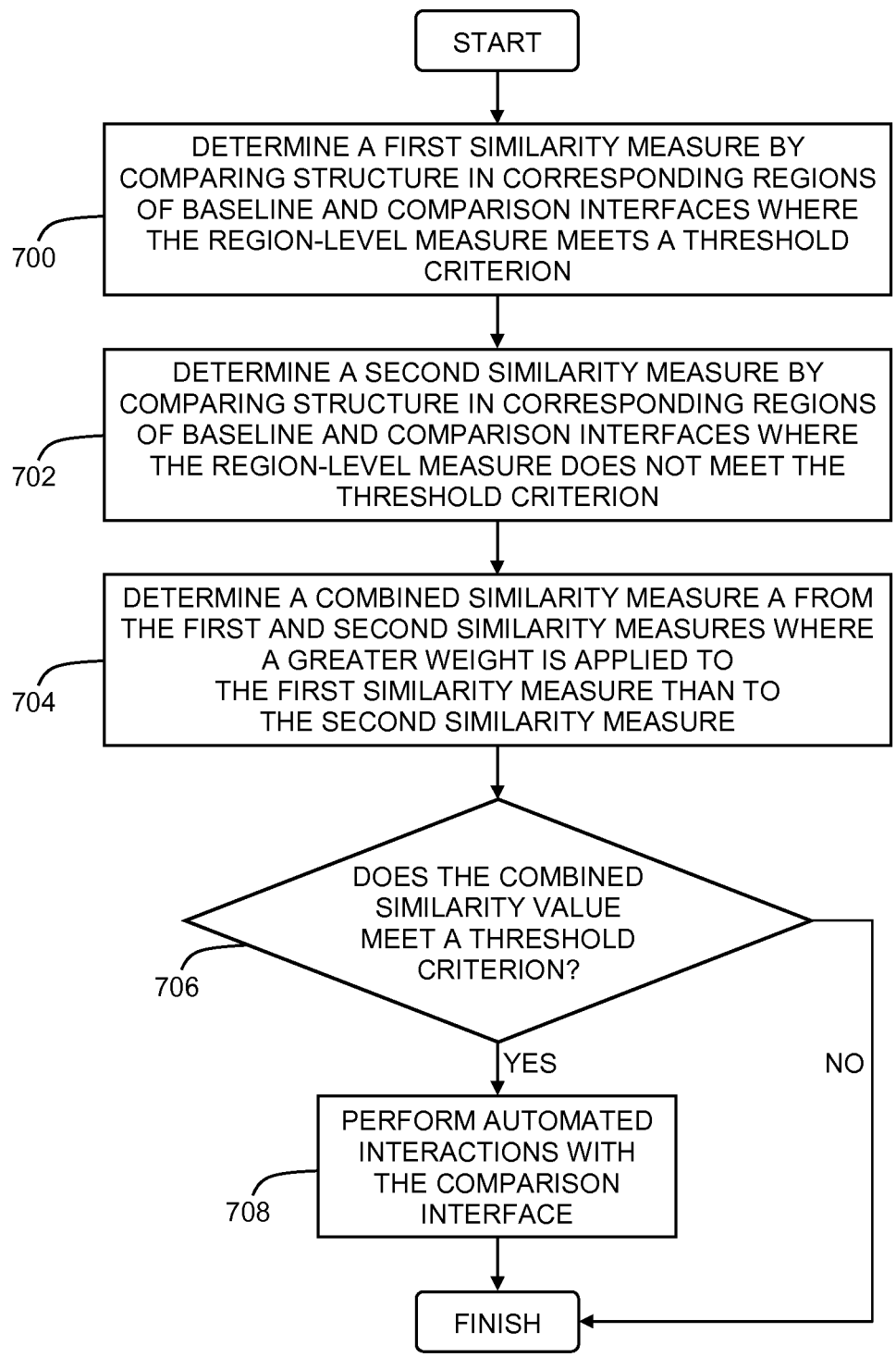
FIG. 7 is a simplified flowchart illustration of an exemplary method of operation of the system of FIG. 5, operative in accordance with an embodiment of the invention.

Reference is now made to FIG. 7, which is a simplified flowchart illustration of an exemplary method of operation of the system of FIG. 5, operative in accordance with an embodiment of the invention. In the method of FIG. 7, a comparison is performed of structure within a first region of a baseline interface of a computer software application with structure in a corresponding region of a comparison interface of the computer software application, where the region-level measure of the first region meets or exceeds a predefined minimum level of user interaction, thereby determining a first similarity measure (step 700). A comparison is performed of structure within a second region of the baseline interface with structure in a corresponding region of the comparison interface, where the region-level measure of the second region does not meet or exceed the predefined minimum level of user interaction, thereby determining a second similarity measure (step 702). A combined similarity measure is determined from the first similarity measure and the second similarity measure where a greater weight is applied to the first similarity measure than to the second similarity measure (step 704). If the combined similarity measure meets a predefined criterion indicating that the baseline interface and the comparison interface are dissimilar (step 706), one or more automated interactions are performed with any element of the comparison interface (step 708), such as in accordance with the method of FIG. 4.

The system of FIG. 5 and the methods of FIGS. 6 and 7 may thus, for example, be used to determine whether the web page shown in FIGS. 1A and 1B was previously encountered, and therefore need not be processed (e.g., crawled) again, by giving those regions of the web page that are known to have had a greater degree of user interaction more weight than those regions of the web page that received little or no user interaction. Thus, a comparison of the web page with a previous baseline version of the web page would give greater weight to regions that previously experienced more user interaction than to regions that contained elements such as advertisements that previously received little or no user interaction, allowing less important parts of the web page to be discounted or ignored altogether.

Referring now to FIG. 8, block diagram 800 illustrates an exemplary hardware implementation of a computing system in accordance with which one or more components/methodologies of the invention (e.g., components/methodologies described in the context of FIGS. 1A-7) may be implemented, according to an embodiment of the invention.

As shown, the techniques for controlling access to at least one resource may be implemented in accordance with a processor 810, a memory 812, I/O devices 814, and a network interface 816, coupled via a computer bus 818 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for determining the similarity of computer software application interfaces, comprising:
    performing a comparison of structure within a first region of a baseline interface of a computer software application with structure in a corresponding region of a comparison interface of the computer software application, where a region-level measure of the first region meets or exceeds a predefined minimum level of user interaction, thereby determining a first similarity measure between the baseline interface and the comparison interface;
    performing a comparison of structure within a second region of the baseline interface with structure in a corresponding region of the comparison interface, where a region-level measure of the second region does not meet or exceed the predefined minimum level of user interaction, thereby determining a second similarity measure between the baseline interface and the comparison interface;
    applying a weight to the first similarity measure that is greater than any weight applied to the second similarity measure; and
    determining a combined similarity measure from the first similarity measure and the second similarity measure.

2. The method of claim 1 and further comprising performing an automated interaction with an element of the comparison interface if the combined similarity measure meets a predefined criterion indicating that the baseline interface and the comparison interface are dissimilar.

3. The method of claim 1 and further comprising determining the region-level measure for any of the regions.

4. The method of claim 3 and further comprising determining the region-level measure where the user interaction is selecting any element of the interface within the region with a pointing device when the interface is displayed on a computer display.

5. The method of claim 3 and further comprising determining the region-level measure where the user interaction is interacting with any element of the interface within the region using a keyboard when the interface is displayed on a computer display.

6. The method of claim 1 and further comprising defining the regions when the interface is displayed on a computer display.

7. The method of claim 6 where the defining comprises programmatically dividing the display area of the computer display on which the interface is displayed into a plurality of virtual regions, where the each of the plurality of regions of the interface displayed on the computer display lies within one of the virtual regions.

8. A method for determining the similarity of computer software application interfaces, comprising:
  identifying among a plurality of regions of a baseline interface of a computer software application a region for which a region-level measure exists of user interaction that occurred within the region; and
  performing a comparison of structure within the region of the baseline interface with structure in a corresponding region of a comparison interface of the computer software application if the region-level measure meets or exceeds the predefined minimum level of user interaction, thereby determining a similarity measure between the baseline interface and the comparison interface.

9. The method of claim 8 and further comprising performing an automated interaction with an element of the comparison interface if the combined similarity measure meets a predefined criterion indicating that the baseline interface and the comparison interface are dissimilar.

10. The method of claim 8 and further comprising determining the region-level measure for any of the regions.

11. The method of claim 10 and further comprising determining the region-level measure where the user interaction is selecting any element of the interface within the region with a pointing device when the interface is displayed on a computer display.

12. The method of claim 10 and further comprising determining the region-level measure where the user interaction is interacting with any element of the interface within the region using a keyboard when the interface is displayed on a computer display.

13. The method of claim 8 and further comprising defining the regions when the interface is displayed on a computer display.

14. The method of claim 13 where the defining comprises programmatically dividing the display area of the computer display on which the interface is displayed into a plurality of virtual regions, where the each of the plurality of regions of the interface displayed on the computer display lies within one of the virtual regions.

* * * * *